Aug. 18, 1931.  E. W STRANDBERG  1,819,447
LAWN MOWER
Filed Oct. 20, 1926  2 Sheets-Sheet 2
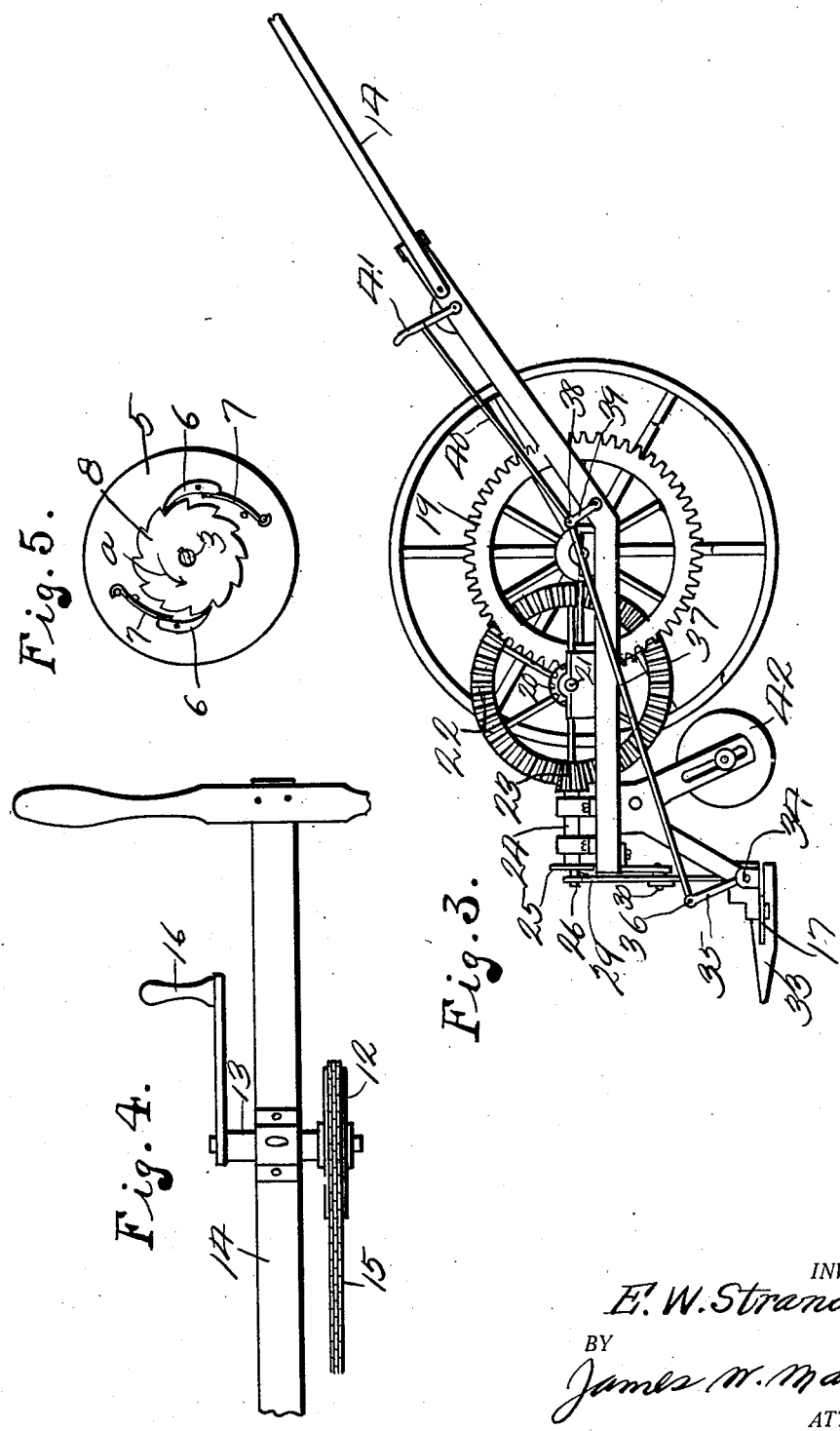
INVENTOR.
E. W. Strandberg
BY
James W. Martin
ATTORNEY.

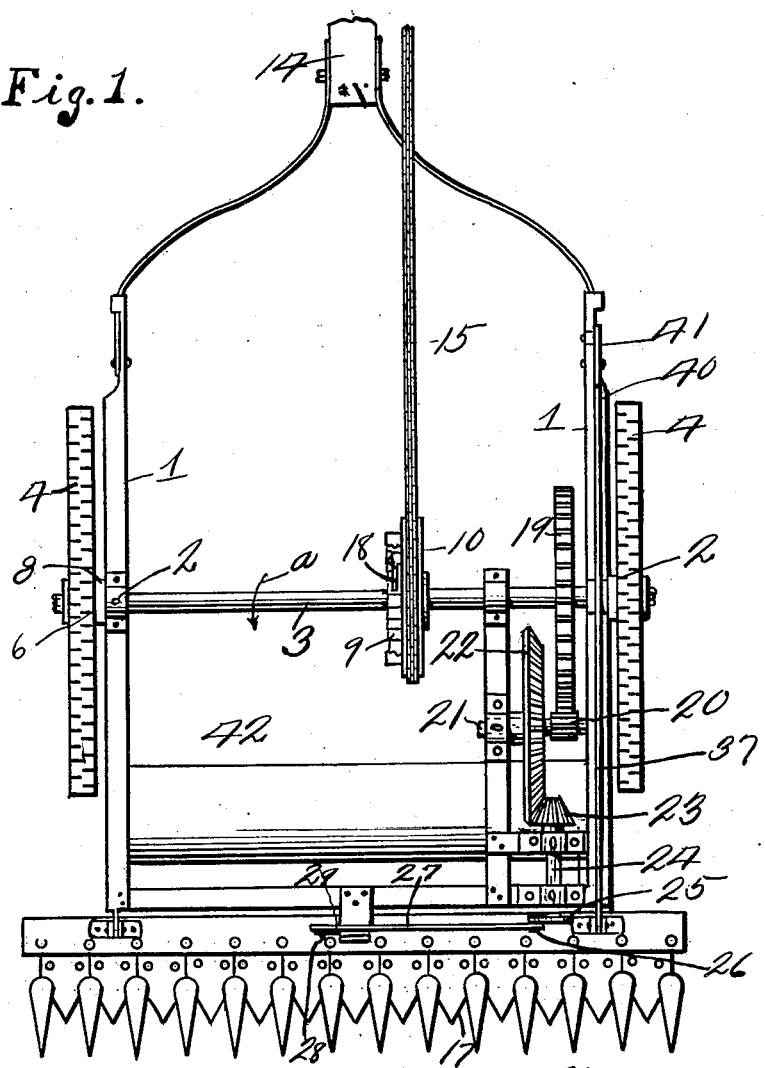

Patented Aug. 18, 1931

1,819,447

UNITED STATES PATENT OFFICE

ERICK W. STRANDBERG, OF OMAHA, NEBRASKA

LAWN MOWER

Application filed October 20, 1926. Serial No. 142,865.

The invention relates to lawn mowers of the reciprocating cutter bar type, said cutter bar being driven through driving connection with a rotatable axle having ground engaging wheels whereby upon a forward movement of the machine the cutter bar will reciprocate and sever the grass.

A further object is to provide the frame of the machine with a rearwardly extending handle member having a hand operated crank thereon and sprocket and chain drive connections between said crank and a ratchet carried by the axle and forming means whereby the cutter bar may be manually reciprocated when the machine is standing still, thereby allowing the cutting or clipping of grass in positions where the machine is standing still.

A further object is to provide a longitudinally disposed drive shaft having a wrist pin thereon and a pitman connection between said wrist pin and the cutter bar and driving connections between said shaft and the axle.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the lawn mower.

Figure 2 is a front elevation of the cutter bar and adjacent mechanism showing the driving connection.

Figure 3 is a side elevation of the lawn mower.

Figure 4 is a top plan view of the rear end of the handle.

Figure 5 is a view in elevation of the wheel ratchet.

Referring to the drawings, the numeral 1 designates the side bars of the frame in bearings 2 of which the axle 3 is rotatably mounted. Axle 3 rotates in the direction of the arrow *a* as the machine moves forwardly over the ground, and one of the wheels 4 is provided with a ratchet drum 5 which rotates therewith. The ratchet drum 5 is provided with pawls 6 which are normally forced inwardly by means of the springs 7 into cooperative engagement with the ratchet wheel 8 carried by the axle 3, therefore it will be seen that as the machine moves over the ground axle 3 will be rotated, but at the same time if the wheels 4 are stationary, for instance when the machine is standing still, the axle 3 may be rotated in the direction of the arrow *a* for operating mechanism hereinafter set forth. Mounted on the axle 3 is a ratchet wheel 9 and rotatably mounted on the axle 3 adjacent the ratchet wheel 9 is a sprocket 10 and extending over the sprocket 10 and over a sprocket 12 carried by the shaft 13 on the handle member 14 adjacent its rear end is a sprocket chain 15. Shaft 13 is provided with a crank 16 adapted to be grasped by the operator. When it is desired to operate the cutter bar 17 while the device is standing still, the operator grasps the handle member 16, rotates the same and rotates the shaft or axle 3 through the medium of the pawl 18 carried by the sprocket 10, and which pawl cooperates with the ratchet wheel 9 carried by the shaft 3, which will rotate said shaft in the direction of the arrow *a*. Mounted on the shaft 3 is a gear 19, which gear meshes with a pinion 20 carried by shaft 21, and which shaft is provided with a bevelled gear 22 which meshes with the bevelled gear 23 of the longitudinally disposed shaft 24. The forward end of the shaft 24 is provided with a disc 25 having a wrist pin 26 thereon, and connected to said wrist pin 26 is a pitman 27, which is pivotally connected at 28 to the vertically disposed rock lever 29. Rock lever 29 is pivotally connected at 30 to a bracket 31 carried by the forward end of the frame and extends downwardly, and has a ball and socket connection 32 with the cutter bar 17, therefore it will be seen that the cutter bar 33 may be oscillated manually when the machine is standing still by the operator grasping the crank 16, or mechanically through the rotation of the ground engaging wheels 4. The lower end of the lever 29 is slidably mounted in a bearing 29a of the ball and socket connection, therefore it will be seen that the cutter bar will have freedom of movement in a horizontal plane upon arcuate movement of the lower end of the lever 29.

The cutter bar frame 33 is pivotally mounted at 34 and is provided with an upwardly extending arm 35, to the upper end of which is connected at 36 a rearwardly and upwardly extending connecting rod 37, which rod is connected at 38 to a rock lever 39, and to which rock lever is connected a rearwardly extending rod 40 connected to the pivoted handle 41, and by means of which handle the cutter bar may be raised or lowered to various elevations for varying the length of cut. The usual lawn mower roller 42 is provided rearwardly of the cutter bar for rolling the grass during a cutting operation.

From the above it will be seen that a lawn mower is provided which is positively driven by the ground engaging wheels or manually when the mower is standing still. It will also be seen that the parts are reduced to a minimum thereby allowing the same to be cheaply manufactured and sold.

The invention having been set forth what is claimed as new and useful is:—

A lawn mower comprising a frame, an axle rotatably mounted in bearings of said frame, a cutter bar frame pivotally connected to the forward end of the frame, a cutter bar slidably mounted in said cutter bar frame, ground engaging wheels carried by the axle, ratchet connection between the ground engaging wheels and the axle, an intermediate shaft adjacent the axle, gear connections between the axle and shaft, a longitudinally disposed shaft, gear connections between the intermediate shaft and the longitudinally disposed shaft, a wrist pin carried by the forward end of the longitudinally disposed shaft, a vertically disposed rock lever, a connecting rod connecting the rock lever and the wrist pin, the lower end of said rock lever having a socket connection with the cutter bar and hand operated means carried by the handle of the frame and connected to the axle and forming means whereby said axle may be rotated independently of the wheels for operating the cutter bar when the machine is at a standstill.

In testimony whereof I hereunto affix my signature.

ERICK W. STRANDBERG.